US012771474B2

(12) United States Patent
Kuriyama et al.

(10) Patent No.: US 12,771,474 B2
(45) Date of Patent: Oct. 20, 2026

(54) WIRELESS COMMUNICATION METHOD, WIRELESS COMMUNICATION SYSTEM, AND WIRELESS TRANSMISSION DEVICE

(71) Applicant: NTT, Inc., Tokyo (JP)

(72) Inventors: Keita Kuriyama, Musashino (JP); Hayato Fukuzono, Musashino (JP); Toshifumi Miyagi, Musashino (JP); Takeshi Onizawa, Musashino (JP)

(73) Assignee: NTT, Inc., Tokyo (JP)

( * ) Notice: Subject to any disclaimer, the term of this patent is extended or adjusted under 35 U.S.C. 154(b) by 258 days.

(21) Appl. No.: 18/834,778

(22) PCT Filed: Feb. 7, 2022

(86) PCT No.: PCT/JP2022/004753
§ 371 (c)(1),
(2) Date: Jul. 31, 2024

(87) PCT Pub. No.: WO2023/148984
PCT Pub. Date: Aug. 10, 2023

(65) Prior Publication Data
US 2025/0125899 A1 Apr. 17, 2025

(51) Int. Cl.
*H04L 1/00* (2006.01)
*H04W 52/24* (2009.01)

(52) U.S. Cl.
CPC ......... *H04L 1/0003* (2013.01); *H04W 52/241* (2013.01)

(58) Field of Classification Search
CPC . H04L 1/0003; H04L 1/0009; H04L 27/0008; H04L 27/36; H04W 52/241; H04W 52/262
See application file for complete search history.

(56) References Cited

U.S. PATENT DOCUMENTS 7,764,727 B2 * 7/2010 Ye ......................... H04L 1/0015 340/870.18
9,807,571 B1 * 10/2017 Bauler .................. H04W 64/00

OTHER PUBLICATIONS

IEEE, "Part 11: Wireless LAN Medium Access Control (MAC) and Physical Layer (PHY) Specifications Amendment 4: Enhancements for Very High Throughput for Operation in Bands below 6 GHz", IEEE Std 802.11ac™—2013, Dec. 11, 2013, 425 pages.

(Continued)

*Primary Examiner* — Vineeta S Panwalkar
(74) *Attorney, Agent, or Firm* — XSENSUS LLP

(57) ABSTRACT

The wireless transmission device includes a power amplifier that varies transmission power. An SNR degradation amount calculation unit calculates an SNR degradation amount {QAM} caused by QAM and an SNR degradation amount {APSK} caused by APSK on the basis of input/output characteristics of the power amplifier acquired from an input/output characteristic storage unit, a QAM modulated signal acquired from a QAM modulation unit, an APSK modulated signal acquired from an APSK modulation unit, and the transmission power of the power amplifier. A modulation scheme selection unit acquires a required SNR {QAM} of QAM and a required SNR {APSK} of APSK from a required SNR storage unit, compares "required SNR {QAM}+SNR degradation amount {QAM}" with "required SNR {APSK}+SNR degradation amount {APSK}", and selects the modulation scheme with the smaller value.

17 Claims, 7 Drawing Sheets

(56) References Cited

OTHER PUBLICATIONS

European Standard, "Digital Video Broadcasting (DVB); Second generation framing structure, channel coding and modulation systems for Broadcasting, Interactive Services, News Gathering and other broadband satellite applications; Part 1: DVB-S2", ETSI EN 302 307-1 V1.4.1, Nov. 2014, pp. 1-80.
Gazda et al., "M-APSK Modulation for SC-FDMA Communication Systems", Department of Electronics and Multimedia Communications, Faculty of Electrical Engineering and Informatics, Technical University of Kosice, Letna 9, 04200 Kosice, Slovakia, 2011, 4 pages.

* cited by examiner

Fig. 3

| | PAPR CHARACTERISTIC | MINIMUM EUCLIDEAN DISTANCE |
|---|---|---|
| QAM MODULATION | × (LARGE) | ○ (LARGE) |
| APSK MODULATION | ○ (SMALL) | × (SMALL) |

Fig. 5

| | LINEAR REGION | NONLINEAR REGION |
|---|---|---|
| QAM MODULATION | ◎ (EXCELLENT) | × (BECAUSE OF HIGH PAPR) |
| APSK MODULATION | ○ (GOOD) | △ (BECAUSE OF LOW PAPR) |

WIRELESS COMMUNICATION METHOD, WIRELESS COMMUNICATION SYSTEM, AND WIRELESS TRANSMISSION DEVICE

CROSS-REFERENCE TO RELATED APPLICATION

The present application is based on PCT filing PCT/JP2022/004753, filed Feb. 7, 2022, the entire contents of which is incorporated herein by reference.

TECHNICAL FIELD

The present disclosure relates to a wireless communication method, a wireless communication system, and a wireless transmission device, and more particularly, to a wireless communication method, a wireless communication system, and a wireless transmission device suitable for use in an environment where transmission power changes.

BACKGROUND ART

Non Patent Literature 1 below describes details of quadrature amplitude modulation (QAM), which is one multi-level modulation scheme for wireless communication. In addition, Non Patent Literature 2 below describes details of amplitude phase shift keying (APSK) which is another example of a multi-level modulation scheme. As represented by these schemes, various multi-level modulation schemes are used in the field of wireless communication.

With regard to the influence of different multi-level modulation schemes on the quality of wireless communication, Non Patent Literature 3 below discloses the following matters:

1. Peak to average power ratio (PAPR) is different for each multi-level modulation scheme;
2. When a power amplifier on the transmitting side uses a nonlinear region, a signal is more likely to be erroneously recognized on the receiving side as the PAPR is higher;
3. When APSK and QAM are compared, the APSK having a lower PAPR is more robust when transmitted in the nonlinear region of the power amplifier.

CITATION LIST

Non Patent Literature

Non Patent Literature 1: IEEE Std 802.11ac-2013, IEEE, 2013

Non Patent Literature 2: ETSI EN 302 307-1 V1.4.1, Digital Video Broadcasting, November 2014

Non Patent Literature 3: "M-APSK Modulation for SC-FDMA Communication Systems", Juraj GAZDA, Denis DUPAK, Dusan KOCUR, Department of Electronics and Multimedia Communications, Faculty of Electrical Engineering and Informatics, Technical University of Kosice, Letna 9, 04200 Kosice, Slovakia, 2011

SUMMARY OF INVENTION

Technical Problem

On the other hand, in a constellation of symbols used in QAM, a plurality of symbols are arranged in a lattice. On the other hand, in the constellation of symbols used in APSK, a plurality of symbols are arranged in one or more concentric circles. When comparing the two, if the number of symbols is the same, the minimum Euclidean distance between the symbols arranged on a QAM constellation is longer than the minimum Euclidean distance on an APSK constellation.

In the communication of the multi-level modulation scheme, the receiving side recognizes the received signal as one of the symbols on the constellation stored in advance. Specifically, likelihoods of a received signal and symbols present around the received signal are calculated for the constellation, and a symbol having the highest likelihood is recognized as the received signal. In this case, the identification accuracy of the received signal becomes higher as the Euclidean distance between the symbols arranged on the constellation is longer. Therefore, in an environment where a received signal is transmitted without distortion, QAM having a longer minimum Euclidean distance is more likely to ensure an excellent bit error rate (BER) compared with APSK.

In a situation where the power amplifier on the transmitting side can amplify a transmission signal in a linear region, distortion hardly occurs in the transmission signal. Therefore, in such a situation, it is easier to ensure better communication quality with QAM than with APSK. On the other hand, in a situation where the transmission power is large and the power amplifier amplifies a signal in a nonlinear region, the case of using APSK is more likely to ensure excellent communication quality than the case of using QAM due to the reason described in Non Patent Literature 3.

In this way, when the suitability of each multi-level modulation scheme is compared, the superiority and inferiority may be reversed depending on whether the power amplifier uses the linear region or the nonlinear region. However, conventionally, control for appropriately switching a multi-level modulation scheme used for communication according to transmission power has not been studied. In this regard, the conventional wireless communication technology has room for further improvement by switching and using a plurality of multi-level modulation schemes.

The present disclosure has been made in view of the above problems, and a first object of the present disclosure is to provide a wireless communication method for ensuring excellent communication quality over a wide transmission power range by appropriately switching and using a plurality of multi-level modulation schemes according to transmission power.

In addition, a second object of the present disclosure is to provide a wireless communication system that ensures excellent communication quality over a wide transmission power range by appropriately switching and using a plurality of multi-level modulation schemes according to transmission power.

In addition, a third object of the present disclosure is to provide a wireless transmission device that ensures excellent communication quality over a wide transmission power range by appropriately switching and using a plurality of multi-level modulation schemes according to transmission power.

Solution to Problem

In order to achieve the above objects, a first aspect is desirably a wireless communication method using a wireless transmission device and a wireless reception device that support at least two multi-level modulation schemes, the at least two multi-level modulation schemes including a first modulation scheme and a second modulation scheme, and the wireless transmission device including a power amplifier that varies transmission power, the wireless communication method including:

a step of acquiring, by the wireless transmission device, a first required signal-noise ratio (SNR) to be ensured when using the first modulation scheme and a second required SNR to be ensured when using the second modulation scheme;

a step of modulating, by the wireless transmission device, a transmission signal using the first modulation scheme to generate a first modulated signal;

a step of modulating, by the wireless transmission device, a transmission signal using the second modulation scheme to generate a second modulated signal;

a step of calculating, by the wireless transmission device, a first SNR degradation amount predicted to occur when the first modulated signal is amplified by the power amplifier at desired transmission power, on the basis of input/output characteristics of the power amplifier;

a step of calculating, by the wireless transmission device, a second SNR degradation amount predicted to occur when the second modulated signal is amplified by the power amplifier at the desired transmission power, on the basis of the input/output characteristics;

a step of calculating, by the wireless transmission device, a first index representing appropriateness of using the first modulation scheme for communication on the basis of the first required SNR and the first SNR degradation amount;

a step of calculating, by the wireless transmission device, a second index representing appropriateness of using the second modulation scheme for communication on the basis of the second required SNR and the second SNR degradation amount;

a step of selecting, by the wireless transmission device, one of the first modulation scheme and the second modulation scheme as a scheme to be used for communication on the basis of a result of comparison between the first index and the second index;

a step of commanding, by the wireless transmission device, the wireless reception device to perform communication using the selected modulation scheme; and a step of communicating, by the wireless reception device, with the wireless transmission device using the commanded modulation scheme.

A second aspect is desirably a wireless communication system using a wireless transmission device and a wireless reception device that support at least two multi-level modulation schemes, in which the at least two multi-level modulation schemes include a first modulation scheme and a second modulation scheme, the wireless transmission device includes a power amplifier that varies transmission power, and is configured to execute:

a process of acquiring a first required SNR to be ensured when using the first modulation scheme and a second required SNR to be ensured when using the second modulation scheme;

a process of modulating a transmission signal using the first modulation scheme to generate a first modulated signal;

a process of modulating a transmission signal using the second modulation scheme to generate a second modulated signal;

a process of calculating a first SNR degradation amount predicted to occur when the first modulated signal is amplified by the power amplifier at desired transmission power, on the basis of input/output characteristics of the power amplifier;

a process of calculating a second SNR degradation amount predicted to occur when the second modulated signal is amplified by the power amplifier at the desired transmission power, on the basis of the input/output characteristics;

a process of calculating a first index representing appropriateness of using the first modulation scheme for communication on the basis of the first required SNR and the first SNR degradation amount;

a process of calculating a second index representing appropriateness of using the second modulation scheme for communication on the basis of the second required SNR and the second SNR degradation amount;

a process of selecting one of the first modulation scheme and the second modulation scheme as a scheme to be used for communication on the basis of a result of comparison between the first index and the second index; and a process of commanding the wireless reception device to perform communication using the selected modulation scheme, and the wireless reception device is configured to communicate with the wireless transmission device using the commanded modulation scheme.

A third aspect is desirably a wireless transmission device that supports at least two multi-level modulation schemes and has a function of communicating with a wireless reception device that supports the at least two multi-level modulation schemes, in which the at least two multi-level modulation schemes include a first modulation scheme and a second modulation scheme, and the wireless transmission device includes a power amplifier that varies transmission power, and is configured to execute:

a process of acquiring a first required SNR to be ensured when using the first modulation scheme and a second required SNR to be ensured when using the second modulation scheme;

a process of modulating a transmission signal using the first modulation scheme to generate a first modulated signal;

a process of modulating a transmission signal using the second modulation scheme to generate a second modulated signal;

a process of calculating a first SNR degradation amount predicted to occur when the first modulated signal is amplified by the power amplifier at desired transmission power, on the basis of input/output characteristics of the power amplifier;

a process of calculating a second SNR degradation amount predicted to occur when the second modulated signal is amplified by the power amplifier at the desired transmission power, on the basis of the input/output characteristics;

a process of calculating a first index representing appropriateness of using the first modulation scheme for communication on the basis of the first required SNR and the first SNR degradation amount;

a process of calculating a second index representing appropriateness of using the second modulation scheme for communication on the basis of the second required SNR and the second SNR degradation amount;

a process of selecting one of the first modulation scheme and the second modulation scheme as a scheme to be used for communication on the basis of a result of comparison between the first index and the second index; and a process of commanding the wireless reception device to perform communication using the selected modulation scheme.

Advantageous Effects of Invention

According to the first to third aspects, it is possible to ensure excellent communication quality in a wide transmission power range by appropriately switching a plurality of multi-level modulation schemes according to transmission power in an environment where the plurality of multi-level modulation schemes can be used.

BRIEF DESCRIPTION OF DRAWINGS

FIG. 3 is a diagram illustrating characteristics of QAM and APSK in comparison.

FIG. 5 is a diagram illustrating the suitability of QAM and APSK in comparison between a case where the power amplifier uses a linear region and a case where the power amplifier uses a nonlinear region.

DESCRIPTION OF EMBODIMENTS

First Embodiment

Overall Configuration of First Embodiment

Figure 1:
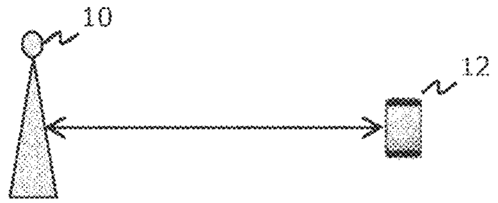
FIG. 1 is a diagram illustrating a configuration example of a wireless communication system according to a first embodiment of the present disclosure.

FIG. 1 is a diagram illustrating a configuration example of a wireless communication system according to a first embodiment of the present disclosure. As illustrated in FIG. 1, the system of the present embodiment includes a wireless transmission device 10 and a wireless reception device 12. The wireless transmission device 10 can be, for example, a wireless communication base station managed by a communication carrier or an access point of a wireless local area network (LAN). On the other hand, the wireless reception device 12 may be a terminal device capable of performing communication in both or one of the licensed band and the unlicensed band.

Features of First Embodiment

In the present embodiment, the wireless transmission device 10 and the wireless reception device 12 each have a function of supporting a plurality of multi-level modulation schemes. Here, specifically, a case where the wireless transmission device 10 and the wireless reception device 12 support quadrature amplitude modulation (QAM) and amplitude phase shift keying (APSK), respectively, will be described.

Figure 2:
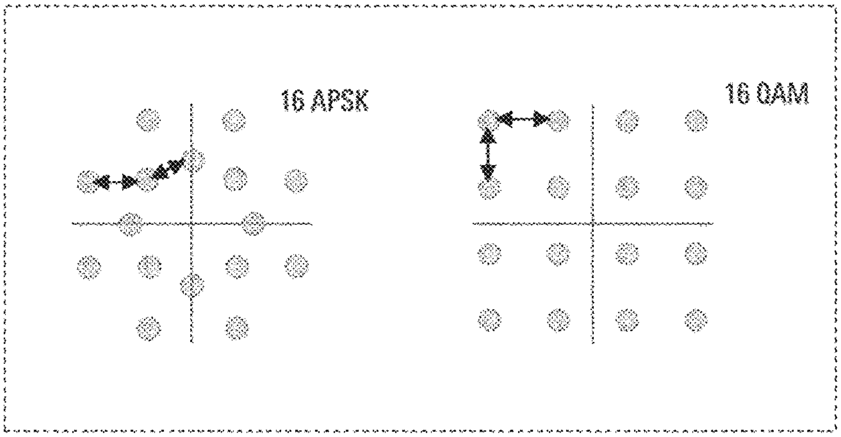
FIG. 2 is a diagram illustrating an APSK constellation and a QAM constellation in comparison.

FIG. 2 is a diagram illustrating an APSK constellation and a QAM constellation in comparison. More specifically, the left side of FIG. 2 illustrates a 16 APSK constellation that handles 16 symbols. In addition, the right side of FIG. 2 illustrates a 16 QAM constellation that handles 16 symbols in the same manner. The position of each symbol represents amplitude and phase.

In the 16 APSK constellation, 16 symbols are arranged at equal intervals by eight symbols on two concentric circles. On the other hand, in the 16 QAM constellation, 16 symbols are arranged at equal intervals in a lattice. In the drawing, the minimum Euclidean distance between symbols in each constellation is represented by a bidirectional arrow. When comparing the two, it can be seen that the minimum Euclidean distance in the case of QAM in which symbols are arranged in a lattice is larger than that in the case of APSK.

Next, a peak to average power ratio (PAPR) will be considered. For transmission of individual symbols on a constellation, a larger amplitude requires a larger power. Therefore, in the APSK, peak power occurs when eight symbols arranged on the outer concentric circle are transmitted. On the other hand, in the case of QAM, peak power occurs when four symbols positioned at four corners are transmitted. Therefore, the ratio of the peak transmission power to the value obtained by averaging the transmission power for all the symbols is lower in the APSK. Therefore, when APSK is used, the PAPR tends to be a lower value than when QAM is used.

FIG. 3 illustrates the characteristics of the minimum Euclidean distance and PAPR described above in comparison between QAM and APSK. ○ and x illustrated in the drawing indicate superiority and inferiority in ensuring a good bit error rate (BER) in wireless communication. The reason why such superiority and inferiority occur will be described below.

The wireless reception device 12 illustrated in FIG. 1 receives a command regarding a modulation scheme to be used for communication from the wireless transmission device 10, and selects a modulation scheme according to the command. In any modulation scheme, the wireless reception device 12 arranges the received signal on a constellation on the basis of the amplitude and the phase, and calculates a likelihood with the received signal for each of the plurality of symbols located around the received signal. Then, the received signal is recognized as a symbol having the highest likelihood.

The longer the minimum Euclidean distance on the constellation is, the large difference is likely to occur in the likelihood calculated for each symbol. Therefore, if the received signal is correctly arranged on the constellation, it is easier to ensure the excellent BER when the QAM having a large minimum Euclidean distance is used than when the APSK having a small minimum Euclidean distance is used. The rightmost column in FIG. 3 represents the relationship as QAM "○ (large)" and APSK "x (small)".

Figure 4:
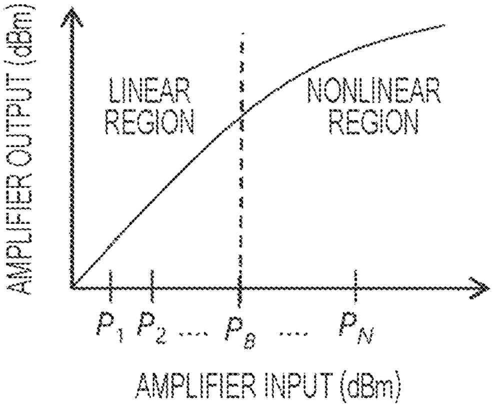
FIG. 4 is a diagram for describing input/output characteristics of a power amplifier included in a wireless transmission device illustrated in FIG. 1.

FIG. 4 illustrates input/output characteristics of the power amplifier included in the wireless transmission device 10 illustrated in FIG. 1. As illustrated in FIG. 4, the power amplifier exhibits a linear input/output characteristic in a region where the input power is PB or less, but the characteristic becomes nonlinear in a region where the input power exceeds PB. Then, distortion is superimposed on the signal amplified by the power amplifier using the nonlinear region. If the distortion occurs in the received signal, in the wireless reception device 12, the received signal is arranged at a position shifted from the original position on the constellation. As a result, the signal amplified in the nonlinear region is likely to be erroneously recognized as an erroneous symbol in the wireless reception device 12.

When the wireless transmission device 10 transmits a radio signal, even if the average power falls within the linear region, a signal with a large amplitude may enter the nonlinear region of the power amplifier. Such a phenomenon is more likely to occur as the PAPR of the multi-level modulation scheme used for communication is larger. Therefore, from the viewpoint of preventing signal misrecognition caused by distortion without distorting the transmission signal, APSK having a low PAPR is superior to QAM having a high PAPR. The center column of FIG. 3 represents the above relationship by the indication of QAM "x (large)" and APSK "○ (small)".

FIG. 5 is a diagram illustrating the suitability of QAM and APSK in comparison between a case where the power amplifier uses a linear region and a case where the power amplifier uses a nonlinear region. When the input power to the power amplifier falls within the linear region, the problem of distortion does not occur even if any modulation scheme is used. In this case, a better BER can be obtained by using QAM rather than APSK in relation to the minimum Euclidean distance. The center column in FIG. 5 represents the above relationship by the indication of QAM "⊙ (excellent)" and APSK "○ (good)".

In the nonlinear region of the power amplifier, the larger the input power, the larger the distortion superimposed on the transmission signal. Therefore, when the input power enters the nonlinear region, a larger distortion is superimposed on the signal corresponding to the peak as the PAPR is higher in the multi-level modulation scheme. Then, as the distortion superimposed on the transmission signal is larger, the signal is more likely to be erroneously recognized in the wireless reception device 12. For this reason, in a situation in which the power transmission device uses the nonlinear region, the communication quality of QAM having a high PAPR is likely to deteriorate more than that of APSK having a low PAPR. The rightmost column in FIG. 5 represents the above relationship by the indication of QAM "x (because of high PAPR)" and APSK "Δ (because of low PAPR)".

As described above, the superiority and inferiority of QAM and APSK are reversed depending on whether the operation region of the power amplifier is a linear region or a nonlinear region. Therefore, in the present embodiment, the multi-level modulation scheme used for communication is appropriately switched between QAM and APSK so that excellent communication quality can be obtained in a real environment in response to this reversal.

[Configuration of Wireless Transmission Device]

Figure 6:
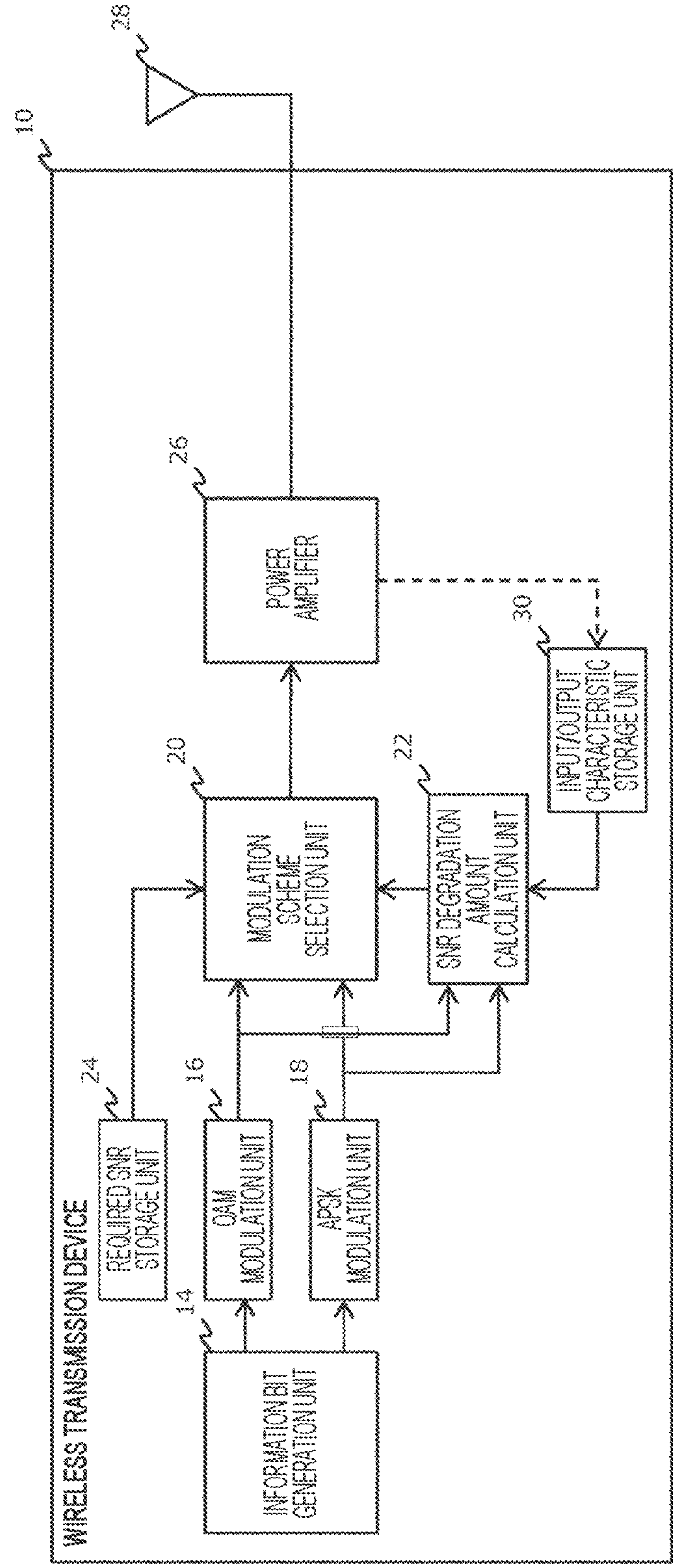
FIG. 6 is a block diagram for describing a configuration of the wireless transmission device according to the first embodiment of the present disclosure.

FIG. 6 is a block diagram for describing a configuration of the wireless transmission device 10 used in the present embodiment to implement the above functions. Each element illustrated in FIG. 6 can be configured by dedicated hardware. Furthermore, these elements can also be configured using an arithmetic processing unit and a program for causing the arithmetic processing unit to execute desired processing, in addition to dedicated hardware.

As illustrated in FIG. 6, the wireless transmission device 10 includes an information bit generation unit 14. The information bit generation unit 14 generates bit data corresponding to information to be transmitted to the wireless reception device 12. The bit data generated by the information bit generation unit 14 is provided to a QAM modulation unit 16 and an APSK modulation unit 18.

The QAM modulation unit 16 modulates the received bit data according to a QAM scheme. On the other hand, the APSK modulation unit 18 modulates the bit data according to an APSK scheme. In either case, a modulated signal generated by modulation is provided to a modulation scheme selection unit 20 and a signal-noise ratio (SNR) degradation amount calculation unit 22.

An SNR degradation amount {QAM} and an SNR degradation amount {APSK} are provided from the SNR degradation amount calculation unit 22 to the modulation scheme selection unit 20. Further, a required SNR {QAM} and a required SNR {APSK} are provided from the required SNR storage unit 24 to the modulation scheme selection unit 20. The modulation scheme selection unit 20 has a function of selecting a scheme to be used for communication from among a plurality of multi-level modulation schemes on the basis of the information. In the present embodiment, since QAM and APSK are assumed as modulation schemes used for communication, the modulation scheme selection unit 20 selects either QAM or APSK as a scheme to be used for communication. The process of selecting the modulation scheme by the modulation scheme selection unit 20 will be described in detail later.

When the modulation scheme selection unit 20 selects QAM, the signal modulated by the QAM modulation unit 16 is supplied to a power amplifier 26. On the other hand, when the modulation scheme selection unit 20 selects APSK, the signal modulated by the APSK modulation unit 18 is supplied to the power amplifier 26.

The power amplifier 26 amplifies the modulated signal generated by the QAM modulation unit 16 or the APSK modulation unit 18 to desired transmission power and supplies the transmission power to an antenna 28. As a result, a signal amplified to desired power by the power amplifier 26 is transmitted from the antenna 28 according to the modulation scheme selected by the modulation scheme selection unit 20.

The wireless transmission device 10 according to the present embodiment includes an input/output characteristic storage unit 30. The input/output characteristic storage unit 30 stores input/output characteristics of the power amplifier 26 in advance. For example, a curve of input/output characteristics as illustrated in FIG. 4 is stored. The input/output characteristic storage unit 30 can provide information on the input/output characteristics to the SNR degradation amount calculation unit 22.

As described above, the required SNR storage unit 24 provides the required SNR {QAM} and the required SNR {APSK} to the modulation scheme selection unit 20. The required SNR necessary for ensuring the desired communication quality has a different value for each modulation scheme. The required SNR {QAM} is a value of SNR to be ensured to obtain desired communication quality when QAM is used as the modulation scheme. On the other hand, the required SNR {APSK} is a value of SNR to be ensured when APSK is used.

The minimum Euclidean distance on the constellation is larger in the case of QAM than in the case of APSK. Therefore, assuming that the transmission signal is transmitted without distortion, the required SNR of QAM is smaller than the required SNR of APSK. Then, since the robustness of communication becomes higher as the required SNR is lower, it is evaluated that the QAM having a lower required SNR has a higher priority of adoption than the APSK under the above assumption.

As described above, the SNR degradation amount calculation unit 22 provides the SNR degradation amount {QAM} and the SNR degradation amount {APSK} to the modulation scheme selection unit 20. The wireless transmission device 10 transmits the signal amplified by the power amplifier 26. As described above, the distortion is superimposed on the signal amplified by the power amplifier 26 in the nonlinear region. If distortion is superimposed on the transmission signal, the SNR is degraded. The SNR degradation amount {QAM} is an SNR degradation amount assumed to occur when the signal modulated by the QAM modulation unit 16 is amplified by the power amplifier 26. Also, the SNR degradation amount {APSK} is an SNR degradation amount assumed to occur when the signal modulated by the APSK modulation unit 18 is amplified by the power amplifier 26.

In the present embodiment, the SNR degradation amount is calculated on the basis of an error vector magnitude (EVM). The EVM is a magnitude of a deviation between symbols included in a signal reaching the wireless reception device 12 and their original positions on the constellation. The EVM can be obtained by calculation if the symbols included in the transmission signal, the transmission power given to the symbols, and the input/output characteristics of the power amplifier 26 are known. The SNR degradation amount calculation unit 22 calculates the SNR degradation amount {QAM} on the basis of the modulated signal generated by the QAM modulation unit 16, the input/output characteristics acquired from the input/output characteristic storage unit 30, and the setting of the transmission power used by the power amplifier 26, and similarly calculates the SNR degradation amount {APSK} on the basis of the modulated signal generated by the APSK modulation unit 18.

The value of the EVM represents the magnitude of degradation of the transmission signal. Therefore, the EVM can be used as it is as the SNR degradation amount. Alternatively, an average SNR may be calculated for each modulation scheme, a predicted SNR of the transmission signal may be calculated on the basis of the EVM, and a difference between the average SNR and the predicted SNR may be used as the SNR degradation amount. In addition, the EVM may be a convergence value for each modulation scheme determined according to transmission power, or may be a value for each piece of transmission data determined by a combination of transmission power and symbols to be transmitted.

The value of the EVM increases as the distortion of the transmission signal increases. The distortion of the transmission signal is likely to occur when the power amplifier 26 uses the nonlinear region. When that region is used, a QAM signal having a high PAPR is more likely to be distorted than an APSK signal having a low PAPR. Therefore, in a situation where the power amplifier 26 uses the nonlinear region, it can be evaluated that the APSK in which distortion is less likely to occur in the transmission signal and the SNR degradation amount is likely to be small has a higher priority of adoption than QAM.

The modulation scheme selection unit 20 selects a modulation scheme to be used for communication by the following processes:

(1) Calculate required SNR {QAM}+SNR degradation amount {QAM}="QAM index";

(2) Calculate required SNR {APSK}+SNR degradation amount {APSK}="APSK index";

(3) Compare QAM index with APSK index, and select modulation scheme having smaller value Both the required SNR and the SNR degradation amount are characteristic values that are small values for a scheme having a high priority of adoption. Therefore, if a scheme having a small "index" which is the sum thereof is selected, it is possible to correctly select a scheme to be adopted for obtaining good communication quality. However, in the above processes (1) and (2), the required SNR and the SNR degradation amount are treated with the same weighting, but the present disclosure is not limited thereto. The above processes (1) and (2) may be changed to give a larger weighting than one or the other of the required SNR and the SNR degradation amount.

Flow of Processing in First Embodiment

Figure 7:
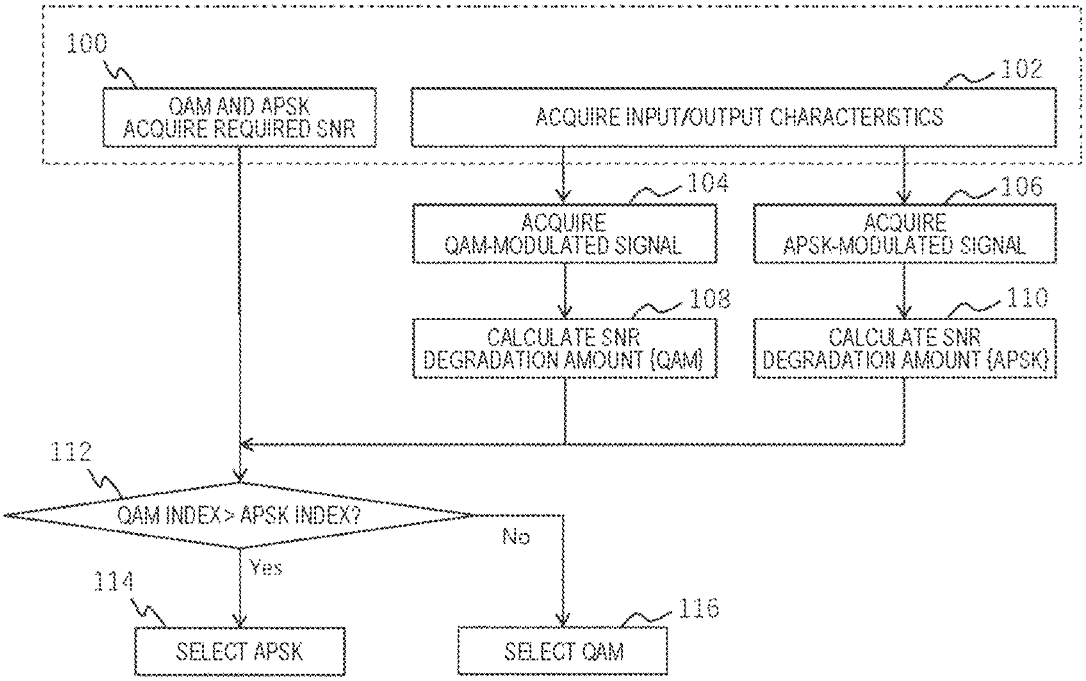
FIG. 7 is a flowchart for describing a flow of main processing performed by the wireless transmission device illustrated in FIG. 6.

FIG. 7 is a flowchart for describing a flow of main processing performed by the wireless transmission device 10 illustrated in FIG. 6. More specifically, it is a flowchart for describing a flow of processing executed in the modulation scheme selection unit 20 and the SNR degradation amount calculation unit 22.

In FIG. 7, the process of step 100 is executed in the modulation scheme selection unit 20. Here, the required SNR {QAM} and the required SNR {APSK} are read from the required SNR storage unit 24 (step 100).

The processes of steps 102 to 110 are executed in the SNR degradation amount calculation unit 22.

Specifically, first, the input/output characteristics of the power amplifier 26 are read from the input/output characteristic storage unit 30 (step 102). The processes of steps 100 and 102 above, that is, the processes surrounded by a broken-line frame in FIG. 7 may be performed only once as an initialization process at the start of the operation of the wireless transmission device 10.

Next, the SNR degradation amount calculation unit 22 acquires a QAM-modulated signal from the QAM modulation unit 16 (step 104), and acquires an APSK-modulated signal from the APSK modulation unit 18 (step 106). Subsequently, the SNR degradation amount {QAM} predicted to occur when QAM-modulated bits are transmitted at the transmission power set in the power amplifier 26 is calculated (step 108). Further, the SNR degradation amount {APSK} predicted to occur when APSK-modulated bits are transmitted at the same transmission power is calculated (step 110).

The processes of step 112 to 116 are executed in the modulation scheme selection unit 20. That is, when the processes of step 100 to 110 above are completed, the modulation scheme selection unit 20 first compares the QAM index that is the sum of the required SNR {QAM} and the SNR degradation amount {QAM} with the APSK index that is the sum of the required SNR {APSK} and the SNR degradation amount {APSK} (step 112).

Then, when QAM index>APSK index is recognized, APSK is selected as the modulation scheme to be used for communication (step 114). On the other hand, when the above relationship is not recognized, QAM is selected as the modulation scheme to be used for communication (step 116). Note that the processes of step 104 to 116 are repeatedly executed for each transmission frame.

As described above, according to the wireless communication system of the present embodiment, a plurality of multi-level modulation schemes can be appropriately switched and used on the basis of the required SNR and SNR degradation amount. Even when the power amplifier 26 uses any transmission power, it is possible to always select and use a modulation scheme advantageous for obtaining high communication quality. Therefore, according to the wireless communication system of the present embodiment, excellent communication quality can be stably ensured over a wide transmission power range.

Modification Example of First Embodiment

Incidentally, in the first embodiment described above, two of 16 QAM and 16 APSK are used as the multi-level modulation scheme, but the present disclosure is not limited thereto. The number of symbols is not limited to 16, and the number of symbols of the two modulation schemes may be different. In addition, various transmission schemes such as orthogonal frequency division multiplexing (OFDM) transmission, discrete Fourier transform-spread-OFDM (DFT-s-OFDM) transmission, and single carrier (SC) transmission can be applied. Various system configurations such as a single input and single output (SISO) configuration and a multiple input and multiple output (MIMO) configuration can be applied. Further, schemes such as Faster-than-Nyquist (FTN) transmission and Nyquist transmission can also be applied. In addition, three or more modulation schemes may be used to appropriately select an optimum modulation scheme from among these modulation schemes.

Furthermore, in the first embodiment described above, the required SNR is treated as a fixed value for each multi-level modulation scheme, but the present disclosure is not limited thereto. For example, the required SNR may be appropriately set according to the required quality of communication. According to such a setting, the frequency of switching the modulation scheme may be reduced.

Furthermore, in the first embodiment described above, the QAM index and the APSK index are updated for each frame, and an optimum modulation scheme is selected for each frame. However, the present disclosure is not limited thereto. That is, the frequency of switching the modulation scheme may be set lower than that of every frame by updating the SNR degradation amount {QAM} and the SNR degradation amount {APSK} every plurality of frames or every fixed time.

In addition, in the first embodiment described above, the wireless transmission device 10 does not include an adaptive transmission power control unit (ATPC: adaptive transmission power control), but the present disclosure is not limited thereto. That is, ATPC may be incorporated in the wireless transmission device 10, and the transmission power used by the power amplifier 26 may be designated by the ATPC.

REFERENCE SIGNS LIST

10 Wireless transmission device
12 Wireless reception device
16 QAM modulation unit
18 APSK modulation unit
20 Modulation scheme selection unit
22 SNR degradation amount calculation unit
24 Required SNR storage unit
26 Power amplifier
30 Input/output characteristic storage unit

The invention claimed is:

1. A wireless communication method using a wireless transmitter and a wireless receiver that support at least two multi-level modulation schemes,
- the at least two multi-level modulation schemes including a first modulation scheme and a second modulation scheme, and
- the wireless transmitter including a power amplifier that varies transmission power, the wireless communication method comprising:
- acquiring, by the wireless transmitter, a first required signal-noise ratio (SNR) to be ensured when using the first modulation scheme and a second required SNR to be ensured when using the second modulation scheme;
- modulating, by the wireless transmitter, a transmission signal using the first modulation scheme to generate a first modulated signal;
- modulating, by the wireless transmitter, a transmission signal using the second modulation scheme to generate a second modulated signal;
- calculating, by the wireless transmitter, a first SNR degradation amount predicted to occur when the first modulated signal is amplified by the power amplifier at desired transmission power, on the basis of input/output characteristics of the power amplifier;
- calculating, by the wireless transmitter, a second SNR degradation amount predicted to occur when the second modulated signal is amplified by the power amplifier at the desired transmission power, on the basis of the input/output characteristics;
- calculating, by the wireless transmitter, a first index representing appropriateness of using the first modulation scheme for communication on the basis of the first required SNR and the first SNR degradation amount;
- calculating, by the wireless transmitter, a second index representing appropriateness of using the second modulation scheme for communication on the basis of the second required SNR and the second SNR degradation amount;
- selecting, by the wireless transmitter, one of the first modulation scheme and the second modulation scheme as a scheme to be used for communication on the basis of a result of comparison between the first index and the second index;
- commanding, by the wireless transmitter, the wireless receiver to perform communication using the selected modulation scheme; and
- communicating, by the wireless receiver, with the wireless transmitter using the commanded modulation scheme.

2. The wireless communication method according to claim 1, wherein the first required SNR is a fixed value set for the first modulation scheme, and the second required SNR is a fixed value set for the second modulation scheme.

3. The wireless communication method according to claim 2, wherein
- calculating the first SNR degradation amount includes:
- estimating a first error vector magnitude (EVM), which is an EVM for the first modulated signal included in the transmission signal of one frame; and
- calculating the first SNR degradation amount on the basis of the first EVM, and
- calculating the second SNR degradation amount includes:
- estimating a second EVM, which is an EVM for the second modulated signal included in the transmission signal of one frame; and
- calculating the second SNR degradation amount on the basis of the second EVM.

4. The wireless communication method according to claim 3, wherein
calculating the first SNR degradation amount further includes:
calculating a first average SNR, which is an average SNR for the first modulation scheme;
calculating a first predicted SNR on the basis of the first EVM, the first predicted SNR being an SNR predicted to occur when the first modulated signal is transmitted; and
calculating a difference between the first average SNR and the first predicted SNR as the first SNR degradation amount, and
calculating the second SNR degradation amount further includes:
calculating a second average SNR, which is an average SNR for the second modulation scheme;
calculating a second predicted SNR on the basis of the second EVM, the second predicted SNR being an SNR predicted to occur when the second modulated signal is transmitted; and
calculating a difference between the second average SNR and the second predicted SNR as the second SNR degradation amount.

5. The wireless communication method according to claim 2, wherein
calculating the first SNR degradation amount includes:
estimating a first EVM, which is an EVM for the first modulated signal included in the transmission signal over a plurality of frames; and
calculating the first SNR degradation amount on the basis of the first EVM, and
calculating the second SNR degradation amount includes:
estimating a second EVM, which is an EVM for the second modulated signal included in the transmission signal over a plurality of frames; and
calculating the second SNR degradation amount on the basis of the second EVM.

6. The wireless communication method according to claim 5, wherein
calculating the first SNR degradation amount further includes:
calculating a first average SNR, which is an average SNR for the first modulation scheme;
calculating a first predicted SNR on the basis of the first EVM, the first predicted SNR being an SNR predicted to occur when the first modulated signal is transmitted; and
calculating a difference between the first average SNR and the first predicted SNR as the first SNR degradation amount, and
calculating the second SNR degradation amount further includes:
calculating a second average SNR, which is an average SNR for the second modulation scheme;
calculating a second predicted SNR on the basis of the second EVM, the second predicted SNR being an SNR predicted to occur when the second modulated signal is transmitted; and
calculating a difference between the second average SNR and the second predicted SNR as the second SNR degradation amount.

7. The wireless communication method according to claim 1, wherein each of the first required SNR and the second required SNR is a value set on the basis of quality of communication to be established.

8. The wireless communication method according to claim 7, wherein
calculating the first SNR degradation amount includes:
estimating a first error vector magnitude (EVM), which is an EVM for the first modulated signal included in the transmission signal of one frame; and
calculating the first SNR degradation amount on the basis of the first EVM, and
calculating the second SNR degradation amount includes:
estimating a second EVM, which is an EVM for the second modulated signal included in the transmission signal of one frame; and
calculating the second SNR degradation amount on the basis of the second EVM.

9. The wireless communication method according to claim 8, wherein
calculating the first SNR degradation amount further includes:
calculating a first average SNR, which is an average SNR for the first modulation scheme;
calculating a first predicted SNR on the basis of the first EVM, the first predicted SNR being an SNR predicted to occur when the first modulated signal is transmitted; and
calculating a difference between the first average SNR and the first predicted SNR as the first SNR degradation amount, and
calculating the second SNR degradation amount further includes:
calculating a second average SNR, which is an average SNR for the second modulation scheme;
calculating a second predicted SNR on the basis of the second EVM, the second predicted SNR being an SNR predicted to occur when the second modulated signal is transmitted; and
calculating a difference between the second average SNR and the second predicted SNR as the second SNR degradation amount.

10. The wireless communication method according to claim 7, wherein
calculating the first SNR degradation amount includes:
estimating a first EVM, which is an EVM for the first modulated signal included in the transmission signal over a plurality of frames; and
calculating the first SNR degradation amount on the basis of the first EVM, and
calculating the second SNR degradation amount includes:
estimating a second EVM, which is an EVM for the second modulated signal included in the transmission signal over a plurality of frames; and
calculating the second SNR degradation amount on the basis of the second EVM.

11. The wireless communication method according to claim 10, wherein
calculating the first SNR degradation amount further includes:
calculating a first average SNR, which is an average SNR for the first modulation scheme;
calculating a first predicted SNR on the basis of the first EVM, the first predicted SNR being an SNR predicted to occur when the first modulated signal is transmitted; and
calculating a difference between the first average SNR and the first predicted SNR as the first SNR degradation amount, and
calculating the second SNR degradation amount further includes:

calculating a second average SNR, which is an average SNR for the second modulation scheme;

calculating a second predicted SNR on the basis of the second EVM, the second predicted SNR being an SNR predicted to occur when the second modulated signal is transmitted; and calculating a difference between the second average SNR and the second predicted SNR as the second SNR degradation amount.

12. The wireless communication method according to claim 1, wherein the step of calculating the first SNR degradation amount includes:

estimating a first error vector magnitude (EVM), which is an EVM for the first modulated signal included in the transmission signal of one frame; and calculating the first SNR degradation amount on the basis of the first EVM, and the step of calculating the second SNR degradation amount includes:

estimating a second EVM, which is an EVM for the second modulated signal included in the transmission signal of one frame; and calculating the second SNR degradation amount on the basis of the second EVM.

13. The wireless communication method according to claim 12, wherein calculating the first SNR degradation amount further includes:

step of calculating a first average SNR, which is an average SNR for the first modulation scheme;

calculating a first predicted SNR on the basis of the first EVM, the first predicted SNR being an SNR predicted to occur when the first modulated signal is transmitted; and calculating a difference between the first average SNR and the first predicted SNR as the first SNR degradation amount, and calculating the second SNR degradation amount further includes:

calculating a second average SNR, which is an average SNR for the second modulation scheme;

calculating a second predicted SNR on the basis of the second EVM, the second predicted SNR being an SNR predicted to occur when the second modulated signal is transmitted; and calculating a difference between the second average SNR and the second predicted SNR as the second SNR degradation amount.

14. The wireless communication method according to claim 1, wherein the step of calculating the first SNR degradation amount includes:

estimating a first EVM, which is an EVM for the first modulated signal included in the transmission signal over a plurality of frames; and calculating the first SNR degradation amount on the basis of the first EVM, and calculating the second SNR degradation amount includes:

estimating a second EVM, which is an EVM for the second modulated signal included in the transmission signal over a plurality of frames; and calculating the second SNR degradation amount on the basis of the second EVM.

15. The wireless communication method according to claim 14, wherein calculating the first SNR degradation amount further includes:

calculating a first average SNR, which is an average SNR for the first modulation scheme;

calculating a first predicted SNR on the basis of the first EVM, the first predicted SNR being an SNR predicted to occur when the first modulated signal is transmitted; and calculating a difference between the first average SNR and the first predicted SNR as the first SNR degradation amount, and calculating the second SNR degradation amount further includes:

calculating a second average SNR, which is an average SNR for the second modulation scheme;

calculating a second predicted SNR on the basis of the second EVM, the second predicted SNR being an SNR predicted to occur when the second modulated signal is transmitted; and calculating a difference between the second average SNR and the second predicted SNR as the second SNR degradation amount.

16. A wireless communication system using a wireless transmitter and a wireless receiver that support at least two multi-level modulation schemes, wherein the at least two multi-level modulation schemes include a first modulation scheme and a second modulation scheme, the wireless transmitter includes a power amplifier that varies transmission power, and being configured to execute:

acquiring a first required SNR to be ensured when using the first modulation scheme and a second required SNR to be ensured when using the second modulation scheme;

modulating a transmission signal using the first modulation scheme to generate a first modulated signal;

modulating a transmission signal using the second modulation scheme to generate a second modulated signal;

calculating a first SNR degradation amount predicted to occur when the first modulated signal is amplified by the power amplifier at desired transmission power, on the basis of input/output characteristics of the power amplifier;

calculating a second SNR degradation amount predicted to occur when the second modulated signal is amplified by the power amplifier at the desired transmission power, on the basis of the input/output characteristics;

calculating a first index representing appropriateness of using the first modulation scheme for communication on the basis of the first required SNR and the first SNR degradation amount;

calculating a second index representing appropriateness of using the second modulation scheme for communication on the basis of the second required SNR and the second SNR degradation amount;

selecting one of the first modulation scheme and the second modulation scheme as a scheme to be used for communication on the basis of a result of comparison between the first index and the second index; and commanding the wireless receiver to perform communication using the selected modulation scheme, and the wireless receiver is configured to communicate with the wireless transmitter using the commanded modulation scheme.

17. A wireless transmitter that supports at least two multi-level modulation schemes and has a function of communicating with a wireless receiver that supports the at least two multi-level modulation schemes, wherein the at least two multi-level modulation schemes include a first modulation scheme and a second modulation scheme, and the wireless transmitter comprises a power amplifier that varies transmission power, and being configured to execute:

acquiring a first required SNR to be ensured when using the first modulation scheme and a second required SNR to be ensured when using the second modulation scheme;

modulating a transmission signal using the first modulation scheme to generate a first modulated signal;

modulating a transmission signal using the second modulation scheme to generate a second modulated signal;

calculating a first SNR degradation amount predicted to occur when the first modulated signal is amplified by the power amplifier at desired transmission power, on the basis of input/output characteristics of the power amplifier;

calculating a second SNR degradation amount predicted to occur when the second modulated signal is amplified by the power amplifier at the desired transmission power, on the basis of the input/output characteristics;

calculating a first index representing appropriateness of using the first modulation scheme for communication on the basis of the first required SNR and the first SNR degradation amount;

calculating a second index representing appropriateness of using the second modulation scheme for communication on the basis of the second required SNR and the second SNR degradation amount;

selecting one of the first modulation scheme and the second modulation scheme as a scheme to be used for communication on the basis of a result of comparison between the first index and the second index; and commanding the wireless receiver to perform communication using the selected modulation scheme.

* * * * *